US006769418B1

(12) United States Patent
Reddy

(10) Patent No.: US 6,769,418 B1
(45) Date of Patent: Aug. 3, 2004

(54) ENGINE FUEL SYSTEM WITH VAPOR GENERATION FOR ENGINE COLD STARTING

(75) Inventor: Sam Raghuma Reddy, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/377,300

(22) Filed: Feb. 28, 2003

(51) Int. Cl.[7] ............................ F02M 33/04; F02N 17/08
(52) U.S. Cl. ................................ 123/520; 123/179.14
(58) Field of Search ............................... 123/514, 516, 123/518–523, 525, 179.7, 179.14, 179.15

(56) References Cited

U.S. PATENT DOCUMENTS

| 5,875,765 A | * | 3/1999 | Norton ..................... 123/520 |
| 5,934,260 A | | 8/1999 | Gadkaree .................. 123/520 |
| 6,189,518 B1 | | 2/2001 | Cooke ....................... 123/549 |
| 6,279,548 B1 | | 8/2001 | Reddy ....................... 123/520 |
| 6,308,119 B1 | * | 10/2001 | Majkowski et al. ........ 701/29 |
| 2002/0046740 A1 | * | 4/2002 | Biesinger et al. ......... 123/520 |

* cited by examiner

Primary Examiner—Andrew M. Dolinar
(74) Attorney, Agent, or Firm—Kathryn A. Marra

(57) ABSTRACT

An engine fuel system includes liquid fuel delivery for normal engine operation and fuel vapor generation for use in cold starting on fuel vapor alone. A fuel vapor generator, preferably in a vehicle fuel tank, includes a fuel vapor collector connected in a return line between a pressure regulator and an in-tank fuel pump. A charging portion includes a pump for conducting fuel vapor from the collector to the cold start canister and a return line to provide circulation of the vapor into the canister. A vapor delivery portion includes a delivery line between the cold start canister and an air inlet of an associated engine. An air inlet line delivers air to the canister during cold starting. A subsystem is formed by the fuel vapor generator connected in a circuit with the in-tank fuel pump and the pressure regulator return fuel line.

8 Claims, 2 Drawing Sheets

US 6,769,418 B1

ENGINE FUEL SYSTEM WITH VAPOR GENERATION FOR ENGINE COLD STARTING

TECHNICAL FIELD

This invention relates to engine fuel systems and, more particularly, to systems with fuel vapor generation for engine cold starting.

BACKGROUND OF THE INVENTION

Under current regulations, all automobile companies will be required to produce some super ultra-low emission vehicles (SULEVs) to meet California regulations. Currently, cold start hydrocarbon (HC) emissions during the first 20 to 30 seconds of cold engine operation account for 70–80% of the total HC emissions in the federal test procedure (FTP) at 75° Fahrenheit. The cold start emissions occur because only about 50% of injected gasoline fuel vaporizes for combustion and the rest escapes as cold start emissions. The problem can get worse for emission certification at 50° F. ambient temperature. Most of the solutions considered for the cold start emission problem are complicated and/or costly involving one or more expensive devices for assisting cold start emission control. A practical approach involving a relatively simple system with supplemental devices having reasonable manufacturing costs was desired.

SUMMARY OF THE INVENTION

The present invention provides an engine fuel system including liquid fuel delivery and fuel vapor generation for use in cold starting on fuel vapor alone. A fuel vapor generator is preferably contained in the vehicle fuel tank. The vapor generator includes a vapor collector connected in a return line between a pressure regulator and an in-tank fuel pump to which returning liquid fuel is passed from the pressure regulator through the vapor collector.

The system may further include a charging portion including a vapor storage cold start canister and a vapor pump arranged to pump or draw fuel vapor from the vapor collector to the cold start canister for storage until needed for cold starting. A return line is connected between the canister and a liquid containing portion of the vapor collector to provide for circulation of the vapor into the canister.

A vapor delivery portion may also be included having a vapor delivery line connected between an outlet portion of the cold start canister and an air inlet of an associated engine. The vapor pump may include an air inlet line for delivering air to the canister during cold starting.

The system may also include a relatively conventional liquid fuel delivery portion including connections from the in-tank fuel pump through the pressure regulator and a fuel control to a liquid fuel injector for injecting fuel into an associated engine air inlet.

A subsystem of the engine fuel system is formed by the fuel vapor generator, including the vapor collector which is connected in a circuit with the in-tank fuel pump, the pressure regulator and the return fuel line.

These and other features and advantages of the invention will be more fully understood from the following description of certain specific embodiments of the invention taken together with the accompanying drawings.

DESCRIPTION OF THE PREFERRED EMBODIMENT

Figure 1:
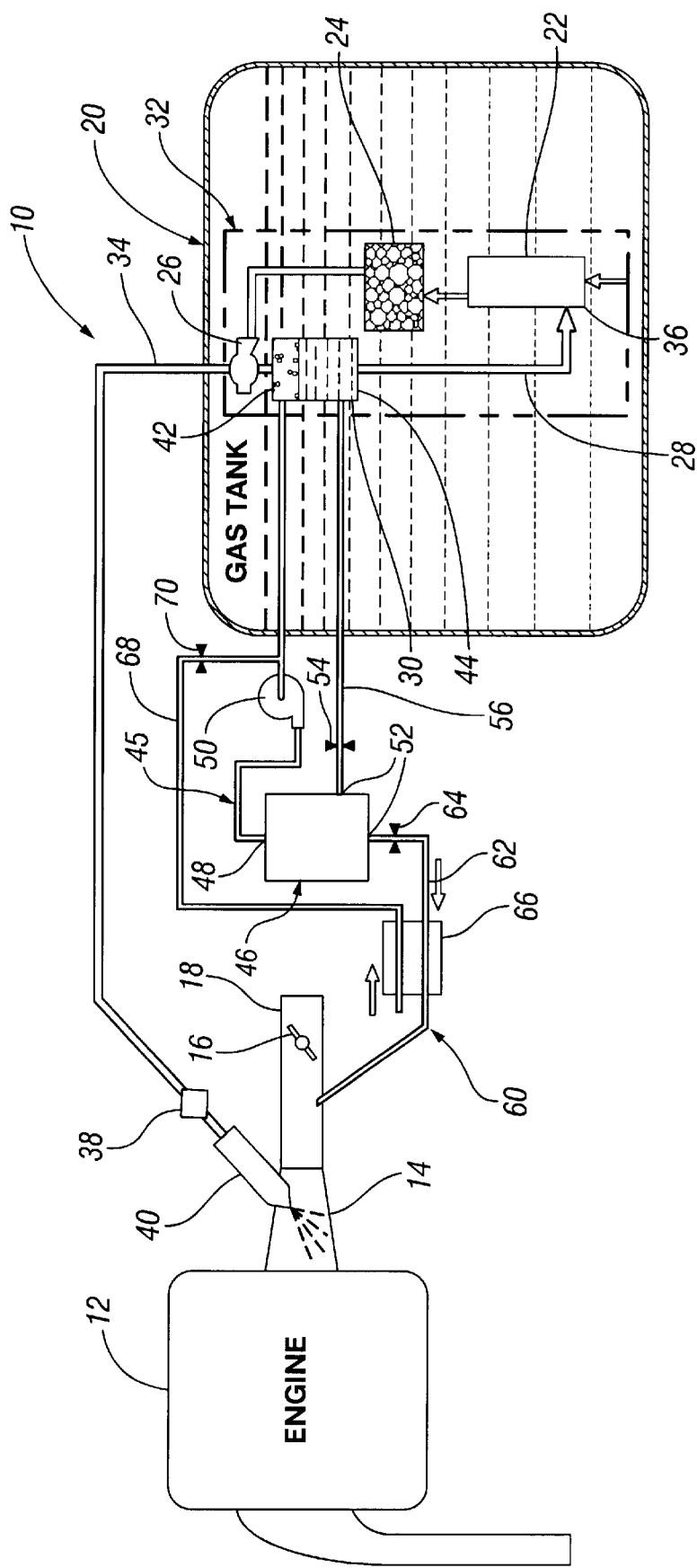
FIG. 1 is a diagrammatic view of an engine fuel system with vapor generation for cold starting and portions of an associated engine formed in accordance with the invention.

Referring first to FIG. 1 of the drawings in detail, numeral 10 generally indicates an engine fuel system formed in accordance with the invention. Fuel system 10 is connected with an engine 12 having an air intake 14 controlled by a throttle valve 16 in an air inlet tube 18.

The engine is mounted in a vehicle, not shown, having a fuel tank 20 for containing fuel, such as gasoline, which is vaporizable at normal ambient temperature conditions. Mounted within the fuel tank 20 are a fuel pump 22, a fuel filter 24, a pressure regulator 26 and a return fuel line 28, which may comprise a fuel sender module. In accordance with the invention, these components are also connected together with a vapor collector 30 to form an in-tank fuel vapor generator 32. It should be understood however that some or all of the components of the fuel vapor generator 32 could be mounted outside the fuel tank if desired.

The fuel pump 22 is connected to draw fuel from within the tank 20 and deliver it at increased pressure through the filter 24 to the pressure regulator 26, from which liquid fuel is delivered at controlled pressure to a delivery line 34. Excess fuel from the pressure regulator 26 is returned through the return fuel line 28, passing through the vapor collector 30 on its way back to the inlet 36 of the fuel pump for recirculation. Liquid fuel supplied to the delivery line is controlled by a fuel injector control 38 and delivered in liquid form to one or more fuel injectors 40 for injection into the engine air inlet or induction system 14 as needed in normal operation.

The vapor collector 30 of the fuel vapor generator 32 includes an upper portion 42 and a lower portion 44. Fuel vapor generated in the system tends to collect in the upper portion of the vapor collector 30 and liquid fuel re-circulated from the pressure regulator collects in the lower portion of the vapor collector before being returned through the bypass line 28 to the fuel pump 22.

The fuel system 10 further includes a charging portion 45 including a cold start canister 46 provided for storing the fuel vapor generated in the vapor generator 32. Canister 46 has an inlet 48 that is connected through a vapor pump 50 with the vapor containing upper portion 42 of the vapor collector 30. The lower portion of the collector 30 is connected through an outlet portion 52 of the canister with a circulation shutoff valve 54 connected in a return line 56 to close or open return flow circulation from the canister 46 to the vapor collector 30.

Fuel system 10 also includes a vapor delivery portion 60 including a vapor delivery line 62 connected between the outlet portion 52 of the cold start canister and the air inlet 14 of the engine. A delivery shutoff valve 64 is located in delivery line 62 to close or open the flow of fuel vapor to the engine air inlet 14. If desired a vapor flow detector 66 may also be located in the delivery line 62. An air inlet line 68 may also be provided which passes through the flow detector 66 and delivers air through an inlet shutoff valve 70 to the inlet of the vapor pump 50.

During normal engine operation, the fuel pump 22 delivers liquid fuel from the tank 20 through the filter 24, pressure regulator 26, fuel delivery line 34 and fuel injector control 38 to the fuel injectors 40. The injectors spray the fuel into the engine air inlet 14 for use in operating the engine 12.

During this operation, excess fuel is returned by the pressure regulator 26 through the vapor collector 30 and return fuel line 28 to the inlet of the fuel pump 22 for recirculation. The lower pressure of fuel in the return line encourages the generation of fuel vapor which collects in the upper portion 42 of the collector 30.

The collected fuel vapor is delivered by the vapor pump 50 to the cold start canister 46 when the pump is operating and valve 54 is open to provide a circuit from the canister through the return line 56 to the lower portion of the vapor collector 30. Valves 64 and 70 are closed during this period to prevent the entry of air or the transfer of vapor into the engine air inlet 14. Vapor is collected in the cold start canister until a desired maximum is reached, at which point suitable control means, not shown, cut off operation of the vapor transfer pump 50 and close the valve 54.

Upon stopping of the engine, the system may be shut down and all valves may be closed to retain the vapor in the cold start canister. If the collection of vapor has been inadequate, operation of the vapor generator and the charging portion 45 may be continued for a time in order to collect more vapor in the canister before the fuel pump is stopped and the valves are closed.

Upon subsequent cold starting of the engine, the starting process may be operated completely on fuel vapor which has been stored in the cold start canister 46. For this purpose, valves 64 and 70 are opened and valve 54 is closed, shutting off the return line 56 between the canister and the vapor generator container 30. The vapor pump 50 is also operated, which draws fresh air through the air inlet line 68 into the pump and delivers it to the cold start canister 46. This causes the stored vapor to be forced through the delivery line 62 into the engine air inlet 14 for starting the engine. The vapor flow detector 66 may be connected with a differential flow sensor in order to indicate the concentration of hydrocarbons during the cold start. A galvanic oxygen sensor may also be used for this purpose.

During cold starting, the engine will desirably be operated for a period of up to 20–30 seconds on the fuel vapor stored in the canister. During this time, no liquid fuel is delivered into the air inlet so that the emissions of hydrocarbons into the engine exhaust are greatly reduced. After the starting period has expired and the engine exhaust catalyst system is operating efficiently, the engine system is switched over to liquid fuel, delivered through the liquid fuel delivery line 34 and injectors 40, for operation in the normal manner. The vapor delivery system is shut off while the normal liquid fuel system is operating.

It may be possible to operate in the vapor starting mode for shorter periods with satisfactory results, since catalyst light-off should occur in about 20 seconds under ordinary conditions. Also, liquid fuel operation may be able to be started when closed loop operation occurs at the time the exhaust oxygen sensor warms up to operating temperature, usually about 10 seconds. An activated carbon canister similar to conventional evaporative emission control canisters may be adequate for storing the cold start vapor; however, other adsorbents which may be available may also be used. The use of a vapor flow detector 66 may not be required if computer controlled estimation of the cold start vapor concentration can be satisfactorily implemented.

Figure 2:
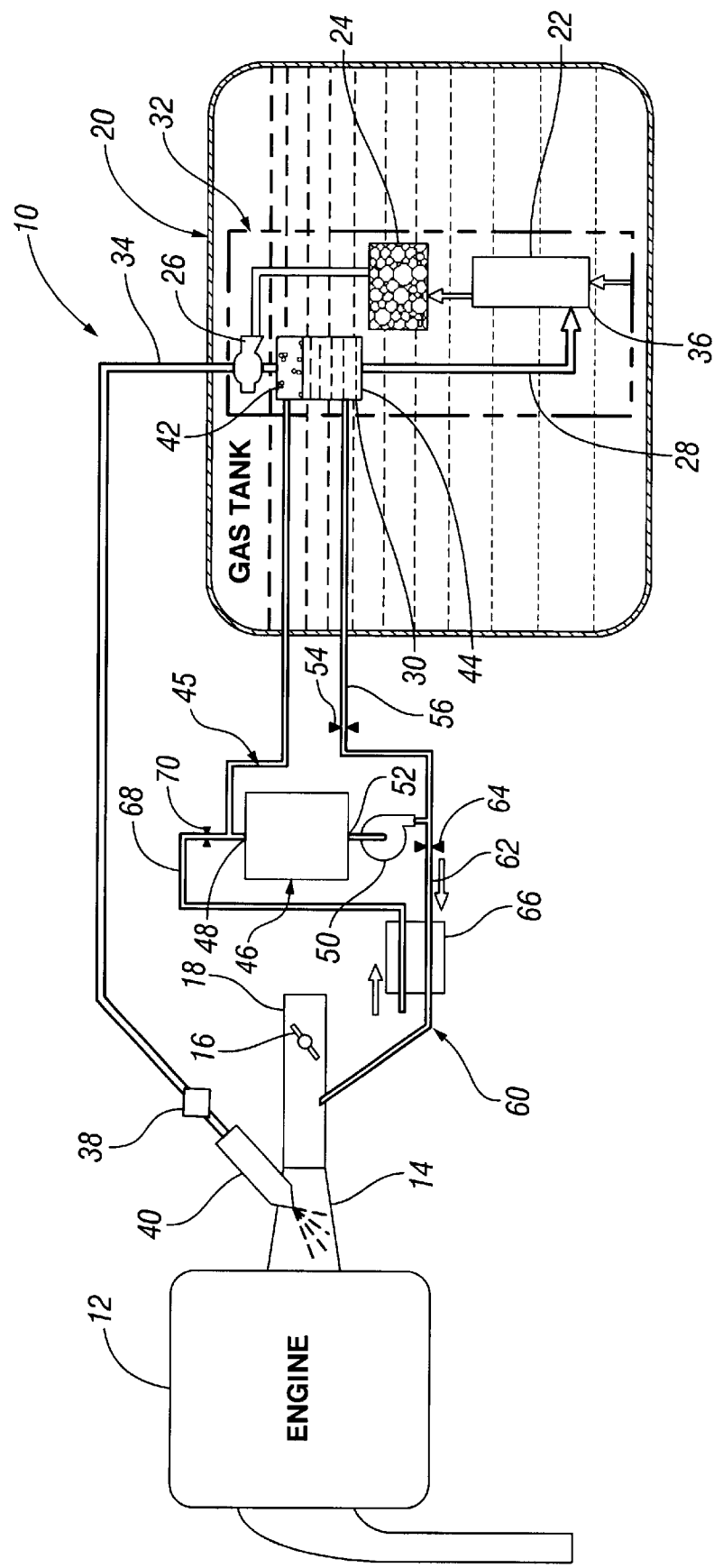
FIG. 2 is a view similar to FIG. 1 showing an alternative embodiment of the fuel system.

Referring now to FIG. 2, there is illustrated a fuel system 72 similar to that of FIG. 1 and wherein like numerals are used to indicate like parts. System 72 has been revised slightly by connecting the vapor pump 50 to the outlet side of the cold start canister 46, between the outlet 52 of the cold start canister 46 and the delivery shutoff valve 64. The pump outlet is also connected with the circulation shutoff valve 54.

On the inlet side of the cold start canister 46, the piping is simplified by relocation of the pump 50.

Operation of the revised system 72 provides the same results as system 10. However, the vapor pump operates to draw fuel vapors or air into the cold start canister instead of delivering them downstream of the pump. Thus, it should be apparent that relocation of components of the system without change in the resulting function makes use of the concepts disclosed herein and is intended to be included in the scope of the invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An engine fuel system with vapor generation for cold starting, the system comprising:

a fuel tank for containing a liquid fuel vaporizable at ambient air temperatures;

a liquid fuel delivery portion including a liquid fuel pump connected to draw fuel from the tank and to deliver pressurized fuel through a pressure regulator and a fuel control to a liquid fuel injector for delivery to an engine intake, the pressure regulator connected to return excess fuel to the fuel pump through a return line;

a fuel vapor generator including a vapor collector connected in the return line between the pressure regulator and the fuel pump and adapted to contain returning liquid fuel in a lower portion and to collect fuel vapor above the liquid fuel in an upper portion of the collector;

a charging portion including a vapor storage cold start canister having inlet and outlet portions connected in a circuit, respectively, with the upper and lower portions of the vapor collector, and a vapor pump connected in the circuit and operable to conduct fuel vapors from the vapor collector into the cold start canister to charge the canister for vapor cold starting; and a vapor delivery portion including an air inlet line connected with the inlet of the canister and a vapor delivery line connected between the outlet portion of the cold start canister and an air inlet of an engine, the vapor pump being connected with the canister between the air inlet line the vapor delivery line.

2. An engine fuel system with vapor generation for cold starting, the system comprising:

a fuel tank for containing a liquid fuel vaporizable at ambient air temperatures;

a liquid fuel delivery portion including a liquid fuel pump connected to draw fuel from the tank and to deliver pressurized fuel through a pressure regulator connected to return excess fuel to the fuel pump through a return line;

a fuel vapor generator including a vapor collector connected in the return line between the pressure regulator and the fuel pump and adapted to contain returning liquid fuel in a lower portion and to collect fuel vapor above the liquid fuel in an upper portion of the collector; and a charging portion having a vapor storage cold start canister with inlet and outlet portions, connected in a circuit, respectively, with the upper and lower portions of the vapor collector, and a vapor pump connected in the circuit and operable to conduct fuel vapors from the vapor collector into the cold start canister to charge the canister for vapor cold starting.

3. An engine fuel system as in claim 2 including a vapor delivery portion having a vapor delivery line connected between the outlet portion of the cold start canister and an air inlet of an engine.

4. An engine fuel system as in claim 3 including a vapor flow detector in the vapor delivery line between the outlet portion of the cold start canister and the air inlet of the engine.

5. An engine fuel system as in claim 3 including an air inlet line connected with an inlet of the cold start canister.

6. An engine fuel system as in claim 5 including an air flow detector in the air inlet line.

7. An engine fuel system as in claim 2 wherein the liquid fuel from the pressure regulator is delivered through a fuel control to a liquid fuel injector.

8. A fuel vapor generator for use in an engine fuel system, the vapor generator comprising:

a fuel tank;

a liquid fuel pump connected for drawing fuel from the tank;

a pressure regulator connected with an outlet of the pump for controlling the pressure of liquid fuel delivered to an air inlet of an associated engine;

a return fuel line from the pressure regulator to the fuel pump;

a vapor collector connected in the return fuel line for collecting fuel vapor from the fuel in an upper portion of the collector; and a vapor storage cold start canister having an inlet portion and an outlet portion connected in a circuit, respectively, with the upper and lower portions of the vapor collector, and a vapor pump connected in the circuit and operable to conduct fuel vapors from the vapor collector into the cold start canister to charge the canister for vapor cold starting.

\* \* \* \* \*